(12) United States Patent  
Davis

(10) Patent No.: US 7,490,041 B2  
(45) Date of Patent: Feb. 10, 2009

(54) SYSTEM TO ALLOW THE SELECTION OF ALTERNATIVE LETTERS IN HANDWRITING RECOGNITION SYSTEMS

(75) Inventor: Scott Davis, North Vancouver (CA)

(73) Assignee: Nokia Corporation, Espoo (FI)

( * ) Notice: Subject to any disclaimer, the term of this patent is extended or adjusted under 35 U.S.C. 154(b) by 867 days.

(21) Appl. No.: 10/621,007

(22) Filed: Jul. 15, 2003

(65) Prior Publication Data

US 2005/0015250 A1     Jan. 20, 2005

(51) Int. Cl.  
*G10L 21/00*     (2006.01)
(52) U.S. Cl. .................. 704/270; 704/3; 704/270.1; 382/186; 382/187; 379/908
(58) Field of Classification Search ................. 704/270, 704/3, 270.1; 382/186, 187; 379/908  
See application file for complete search history.

(56) References Cited

U.S. PATENT DOCUMENTS

| | | | | |
|---|---|---|---|---|
| 6,002,390 A * | 12/1999 | Masui | ......................... | 345/173 |
| 6,333,995 B1 * | 12/2001 | Perrone | ....................... | 382/187 |
| 6,480,621 B1 * | 11/2002 | Lyon | ........................... | 382/157 |
| 6,826,306 B1 * | 11/2004 | Lewis et al. | .................. | 382/187 |
| 6,836,759 B1 * | 12/2004 | Williamson et al. | .......... | 704/235 |
| 2003/0013483 A1 * | 1/2003 | Ausems et al. | .............. | 455/556 |
| 2004/0183833 A1 * | 9/2004 | Chua | ........................... | 345/773 |

* cited by examiner

*Primary Examiner*—Qi Han  
(74) *Attorney, Agent, or Firm*—Ware, Fressola, Van Der Sluys & Adolphson, LLP

(57) ABSTRACT

A system and/or method that provides a virtual alpha-numeric keyboard based at least in part upon a user real-time input entry within a portable computing device. An input component receives an input providing a recognition component to determine and/or infer possible input entries (e.g., virtual keys). Once possible input entries are determined and/or inferred, a rendering component concurrently displays the virtual keys during the input entry.

19 Claims, 12 Drawing Sheets

SYSTEM TO ALLOW THE SELECTION OF ALTERNATIVE LETTERS IN HANDWRITING RECOGNITION SYSTEMS

TECHNICAL FIELD

This invention relates generally to a system and methodology that enhances voice and/or handwriting recognition in connection with a portable computing device.

BACKGROUND OF THE INVENTION

The development and refinement of personal computing devices continues to occur at an extremely rapid pace. Advancements in personal computing devices are mostly based upon consumer demand. In order to fulfill consumer needs, the computer industry provides a plurality of devices (e.g., models of devices having various applications, and features). Smaller devices, game applications, web access, storage capacity, display size, ergonomics, phonebook storage, longer battery life, are a few examples that encourage the industry to improve upon existing technology.

Mobile devices are increasing in technological ability wherein personal computing devices can provide a plurality of functionality within a limited device-space. Personal computing devices can be, but not limited to for example, cell phones, PDA, pagers, laptops, tablets, hand-helds . . . . Although each device employs a specific function for a user, devices have been developing to allow overlapping functionality in order to appeal to consumer needs. In other words, personal computing devices have incorporated a plurality of features and/or applications such that the devices have invaded one another's functionality. For example, cell phones can provide cellular service, phonebooks, calendars, games, voicemail, paging, web browsing, video capture, image capture, voice memos, voice recognition, hand-writing recognition . . . .

As a result, portable computing devices have incorporated a variety of techniques and/or methods for inputting information. Such computing devices facilitate entering information employing devices such as, but not limited to, keyboards, keypads, touch pads, touch-screens, speakers, stylus' (e.g., wands), writing pads, . . . . However, input devices such as speakers and writing pads bring forth user personalization deficiencies in which each user can not utilize the data entry technique (e.g., voice, and/or writing) similarly.

Within different geographical regions, voice and writing recognition entail numerous comprehension boundaries to overcome in order to meet the consumer need of data entry. Such boundaries can be geographical and linguistic related dependent upon the individual case. For example, consumers utilizing voice recognition in the United States can speak English, yet have distinct and/or different accents. Thus, the voice recognition for data entry within a personal computing device should account for the differentiation based at least in part upon accent variation (e.g., the southern drawl).In another example, consumers employing writing recognition in the United States can write in English, yet have distinct and/or different letter variations. Still another problem within handwriting recognition is the accessibility of a keyboard when the recognition system cannot comprehend the data entry. Traditionally, if the recognition system cannot interpret the data entry, the user must stop, access menu screens in order to access a keyboard to correct the data entry. Once the keyboard is used for the misunderstood character, the user has to switch back to utilize the writing pad for data entry. Therefore, consumer need for efficient data entry techniques drive the personal computing device industry to employ voice and/or writing recognition in which personal idiosyncrasies are accounted. In view of the above, there is a need to improve upon and/or provide recognition systems for facilitating user input into personal computing devices.

SUMMARY OF THE INVENTION

The following presents a simplified summary of the invention in order to provide a basis understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention generally relates to a handwriting and/or voice recognition system employed within a portable computing device. In accordance with an aspect of the subject invention, employment of a virtual alpha-numeric keyboard in connection with real-time data entry via voice and/or handwriting is facilitated. The subject invention overcomes deficiencies associated with conventional recognition systems that require extraneous steps to access an alpha-numeric interface in order to correct, validate and/or augment a recognition system. More particularly, the invention provides for dynamically analyzes an analog user input (e.g., hand-writing, voice, image . . . ) and determining and/or inferring a corresponding subset of potential alpha-numeric representation(s) that relate to the user input. As the user inputs information, the invention provides on a same display for making the input a set of virtual keys that the invention believes likely correspond to what the user is inputting. Thus, the invention mitigates a need for a user to access another display for virtual alpha-numeric keys.

In accordance with one exemplary aspect of the current invention, the voice and/or handwriting recognition system facilitates employment of an alpha-numeric keyboard such that possible input entries are determined based at least upon the user real-time input. The voice and/or handwriting recognition system receives a real-time input, in which the input is analyzed. The system provides the analysis of the real-time input entry with a data store in which assistance for recognition of the input is provided. Upon recognition analysis, the recognition generates possible input entries for the alpha-numeric keyboard, mitigating the procedure in which an alpha-numeric keyboard is accessed. Moreover, artificial intelligence based techniques/schemes (e.g., implicitly and/or explicitly trained classifiers) can be employed if desired to facilitate automated voice and/or handwriting recognition of the input entry. Thus, as a classifier becomes trained with a particular user's input characteristics, the classifier can provide candidate alpha-numeric keys with high confidence and thus present a smaller subset of candidates on the screen. Moreover, to facilitate multiple users of a same device, the invention can provide for employment of a plurality of user profiles that can be employed in connection with classifier(s) to provide the aforementioned advantages of the invention to multiple users of a same device.

In accordance with yet another aspect of the present invention, a handwriting recognition system can facilitate recognition by utilizing starting and/or ending location on a writing pad. For example, letters and numbers can be written in various fonts and sizes. Yet, the commonality of starting and/or ending location can provide elimination and/or election of input entries which allows the mitigation of the generation of the alpha-numeric keyboard.

In accordance with another aspect of the present invention, the handwriting recognition system can facilitate recognition by employing real-time recognition based upon input entry. The recognition of the input entry can be provided in real-time during the continuous data entry by a user utilizing the personal computing device. For example, in addition to starting and/or ending location on a writing pad, the input entry information between the start and end location can facilitate the handwriting recognition.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
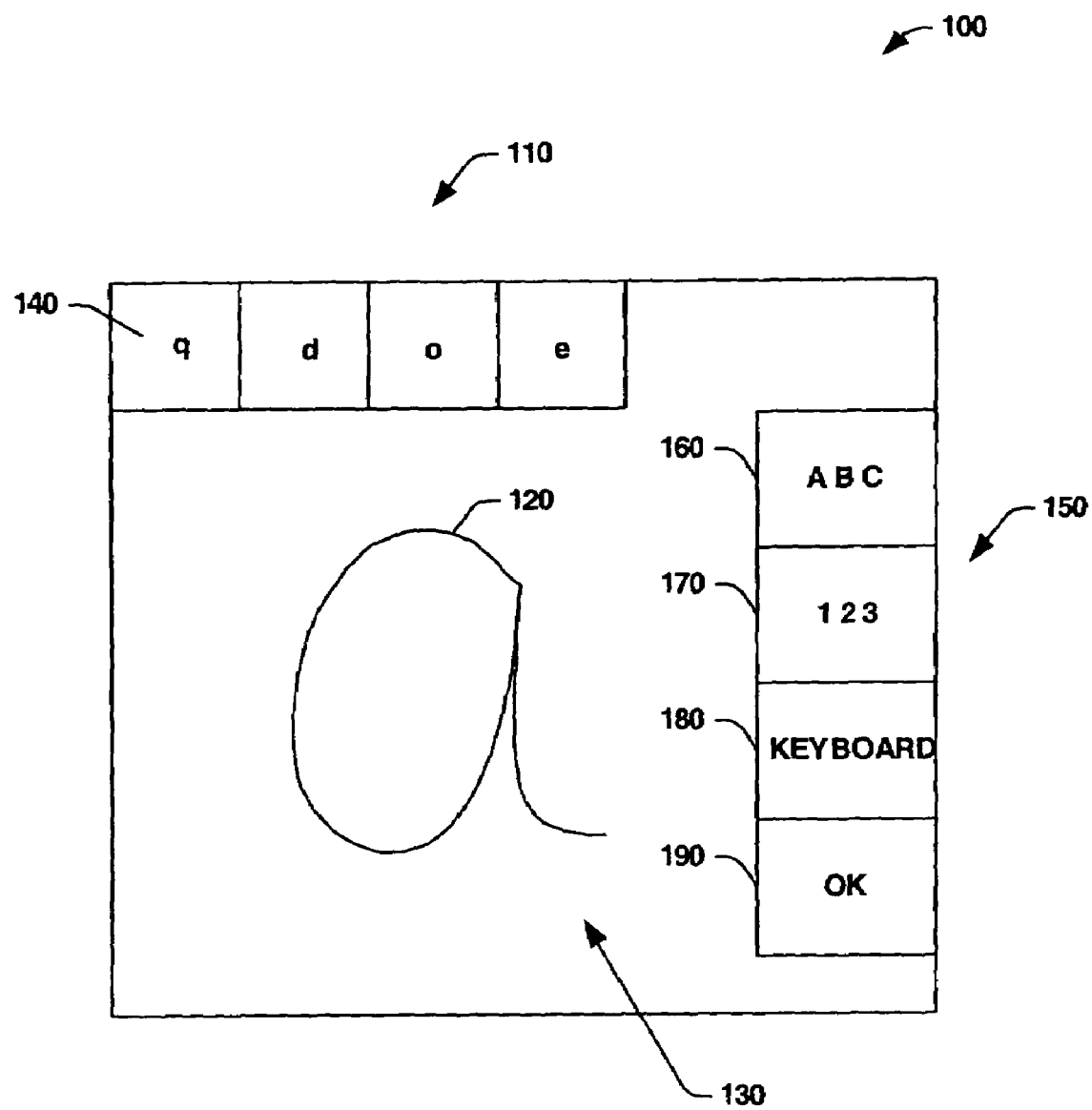
FIG. 1 is a block diagram of an exemplary display in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as described herein. The present invention can employ various inference schemes and/or techniques in connection with the present invention. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Now referring to the figures, FIG. 1 illustrates an exemplary display 100 for a personal computing device employing a virtual alpha-numeric keyboard 110 based at least in part upon an input entry 120. The display 100 provides a writing pad 130 in which a user can employ in order to write data information for entry into the personal computing device. The writing pad 130 can incorporate touch-screen technology which facilitates handwriting recognition allowing the invention to determine handwriting position and movement. The input entry 120 is the user data information entry into the personal computing device. Within the display 100, the input entry 120 can be recognized in real-time within an area of the writing pad 130 in which handwriting recognition is facilitated for the personal computing device. Upon the user input entry 120 written within the area 130, the invention enhances employment of the virtual alpha-numeric keyboard 110 by displaying a set of alpha-numeric characters the invention determines and/or infers to correspond (within a certain degree of confidence) to the user entry. In real-time, as the entry 120 is made, the invention dynamically presents alpha-numeric virtual keys 110 that it believes to be relevant to the entry 120. It is to be appreciated that a time 0 ($t_0$) or close temporally thereto less information is available for the invention to analyze as compared to a time when the input is fully entered. Accordingly, confidence of the analysis increases as more data is made available. Likewise, as the invention learns more about a particular user, confidence is also increased and thus less potential keys may be displayed since the invention can narrow down the potential keys to be shown to the user with a particular confidence level.

The invention can provide for a user to set a recognition level in order to enhance a user experience. Thus, if a recognition level is set to high, for example, the invention can only display a very small set of characters or none at all so as to mitigate cluttering of the display space 130. In other words, in order to display any keys the confidence level should be very high. Alternatively, the recognition level can be set at a lower level for example and display keys continuously—this feature for example could be useful during a training phase of a classifier being employed to learn a user's input style (handwriting, speech . . . ).

The display 100 provides a plurality of options 150 relating to various features and functions available from a computing device. The user can select for example between options such as, but not limited to, type of writing (e.g., numeric or alphabetical, . . . ), input selection (e.g., keyboard, writing pad, touch screen, speaker, . . . ), verification (e.g., "OK," enter key, . . . ), sensitivity, brightness, lower case, upper case, drawing, . . . . The display 100 can include an alphabetical option 160 in which the input entry 130 can be specified to alphabetical handwriting input within the user selected language of choice (e.g., from plurality of options 150). On the other hand, a numeric option 170 enables the user to specify numeric input entry for the personal computing device. Additionally, a keyboard option 180 provides the user to change from the writing pad for data entry (as depicted in display 100) to an external keyboard. For example, the user can prefer to handwrite numeric data entry, while utilize a keyboard for alphabetical data entry. The keyboard option 180 enables selection between keyboard data entry versus a handwriting data entry based at least upon a user preference. Furthermore, the verification option enables the user to verify actions and/or selections within the personal computing device and/or the plurality of options 150. For example, in order to decrease an amount of accidental selection between the options 150, the device can opt to require verification, once an option is selected.

It is to be appreciated that any suitable input entry (e.g., voice, handwriting, . . . ) can be recognized. Additionally, the present invention is not limited to letter recognition in the English language, but rather encompasses all handwriting recognition including, but not limited to, letters, numbers, symbols, . . . within a plurality of languages. For example, the present invention can provide recognition and employment of the virtual alpha-numeric keyboard for input entry 120 being mathematical equations. Mathematical equations contain various symbols (e.g., operators, exponentials, logarithms, integrals, Greek letters, . . . ). Although keyboard input entry for mathematical equations is possible, handwriting such data is much more feasible. The present invention facilitates the input entry with employment of the virtual alpha-numeric keyboard 110 containing determined and/or inferred virtual keys 140 based at least upon the real-time user input entry 120. Additionally, the invention can be employed in connection with pseudo languages such as for example short-hand. Moreover, the invention can be employed in connection with multi-tasking disparate input types. Thus, a user can write some portion of an input and speak another and the invention can switch between recognition modes dynamically and present virtual keys seamlessly to a user regardless of input format.

It is to be appreciated that any suitable scheme for recognizing the input entry can be employed. For example, the system 100 can provide handwriting recognition by employing the virtual alpha-numeric keyboard 110 in which historic data can be stored as to enable recognition analysis for real-time input entry 120. For instance, a classifier in accordance with the subject invention can be trained using the historical input entry 120 to facilitate training the classifier to provide a high probability of success decision regarding the satisfaction of the handwriting recognition needs. Thus, the present invention can utilize artificial intelligence (AI) techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation) to facilitate recognition of input entry 120 with employment of the virtual alpha-numeric keyboard 110 within the personal computing device.

For example, the user can select the alphabetical option 160 to categorize the input entry in which the lower case letter "a" can be entered as the input entry 120 (as shown) within the area of writing pad 130. Within real-time, the present invention employs the virtual alpha-numeric keyboard 110 providing virtual keys 140 which are determined and/or inferred based at least upon the input entry 120. In accordance with one aspect in the present invention, the virtual keys 140 can be displayed to the user based upon the recognition threshold such that the virtual keys can be displayed if the recognition system cannot comprehend the input. In the present example, the virtual keys "a," "d," "o," and "q" are displayed within the writing pad 130 allowing a user to select the appropriate input entry. The virtual keys 140 within the virtual alpha-numeric keyboard 110 can be selected by the user as the input entry 130.

It is also to be appreciated that the invention does not simply apply to recognition and rendering of individual characters or numerals, but the invention can be applied to recognition of words, sentences, and other strings of characters and/or numerals. Thus, for example as a user inputs a word in cursive, virtual blocks of words could appear to the user on the display that the invention infers and/or determines to be most likely candidates corresponding to the user input. Moreover, the invention can assist with error correction of completed words. For example, a user may not notice that a letter in a word is wrong until a word has been completed, however the invention could remember the input that was employed to generate the word, and the user could select the incorrect letter(s) and use a recognizer to select from alternative letters or re-write the letter and select from various options again.

Figure 2:
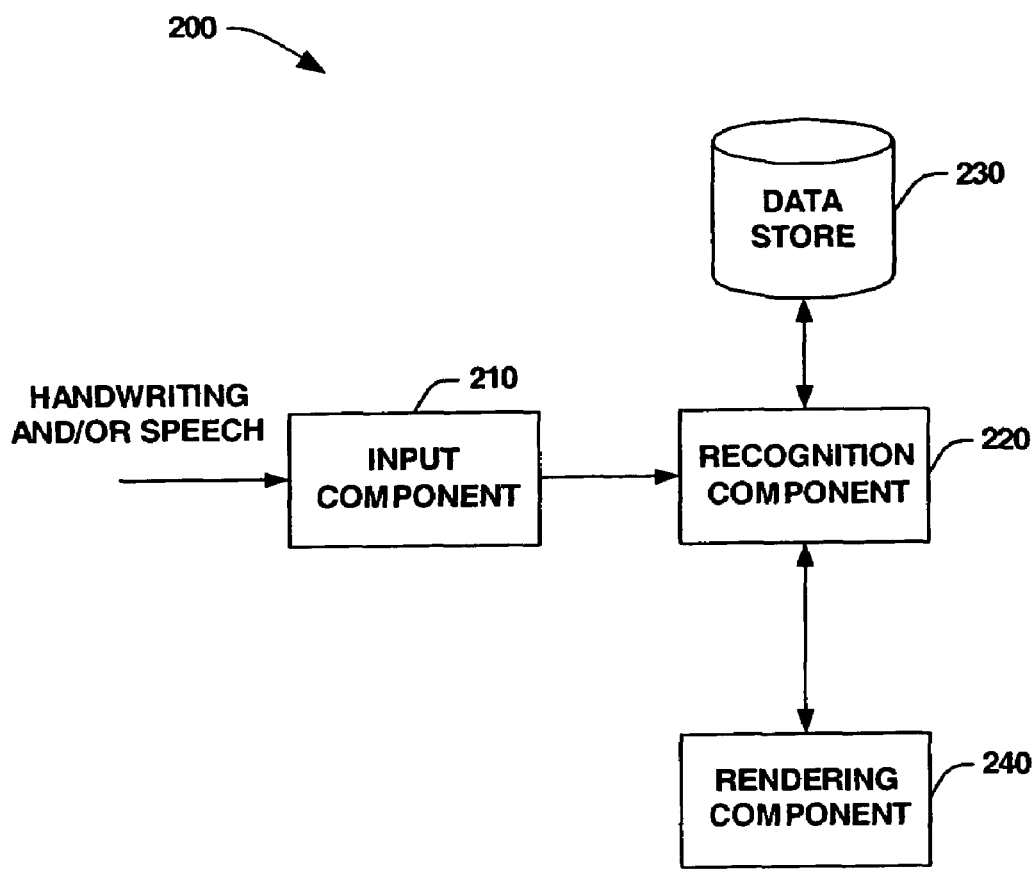
FIG. 2 is a block diagram of a handwriting recognition system in accordance with an aspect of the present invention.

Turning to FIG. 2, a recognition system 200 illustrates handwriting and/or speech received by an input component 210 such that the recognition of the input is facilitated by employing the virtual alpha-numeric keyboard containing virtual keys which the user can select as the input entry. The portable computing device provides data input entry via input component 210. For example, the voice and/or handwriting input entry can be, but not limited to, a touch screen, speaker, digital pen tablet, . . . . A recognition component 220 provides recognition of the input entry, and facilitates employing the alpha-numeric keyboard based at least upon the input entry and/or a recognition threshold. For example, the system 200 provides virtual keys based upon the input entry. The virtual keys can be displayed according to the recognition threshold such that the system 200 displays virtual keys as a function of the recognition threshold (e.g., comprehended within a percentage). Additionally, the recognition component 220 provides for determining dynamically virtual keys to present to a user in real-time, concurrently with the input entry.

The recognition component 220 utilizes a data store 230 in order to facilitate the employment of the alpha-numeric keyboard by storing recognition assistance data. For example, the data store 230 can contain, but not limited to containing, user profile(s), historical information, recognition techniques, characters, letters, symbols, fonts, speech patterns, . . . . The data store 230 for eaxmple can be computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

In one aspect in accordance with the present invention, multiple users with various input entry characteristics can employ the virtual alpha-numeric keyboard regardless of input entry differences and/or format. The invention provides user profiles in which individual input characteristics are utilized in order to facilitate corresponding virtual keys within a virtual alpha-numeric keyboard to a user input entry. For example, user #1 can be English speaking preferring manuscript, while another user #2 can be Spanish speaking preferring cursive. The invention employs user profile(s) in order to accommodate the specific input entry characteristics of the respective users. Thus, the first user can speak English and write manuscript to generate virtual keys within an alpha-numeric keyboard on a portable computing device; and the second user can speak Spanish and write cursive to generate the alpha-numeric keyboard on the same portable device.

In one aspect in accordance with the present invention, the data store 230 provides various training applications providing the user to train the system 200. For example, the data store 230 can provide applications in which the system 200 analyzes the user by inquiring of certain personal attributes (e.g., right and/or left handed, rate of input, font preferred, language, region, . . . ). In another example, the data store 230 enables storage of information regarding the writing pad for facilitating recognition of input entry based on a starting and/or ending point.

Furthermore, the rendering component 240 displays the virtual keys of the virtual alpha-numeric keyboard determined by the recognition component 220 to convey to the user based at least in part upon the user input entry and/or the recognition threshold. The rendering component 240 provides the user with the alpha-numeric keyboard populated with the recognition component 220 determined virtual keys. For example, as the real-time input entry is recognized by the recognition component 220, the rendering component 240 can provide the user with virtual keys which the system 200 believes to be the input entry from the user in the portable computing device. The rendering component 240 can visually present information, for example, via a computer monitor, a television screen, a personal digital assistant (PDA) and/or a touch screen.

In another embodiment of the present invention, the system 200 can provide voice recognition. The input component 210 can capture an input entry (e.g., voice sample(s)) via a speaker, which is analyzed by the recognition component 220. The recognition component 220 can determine virtual keys to convey to the user that correspond to the voice input within a certain degree of confidence. As discussed supra, the recognition component can perform a deterministic and/or inferential analysis in connection with the subset of virtual keys that are to be conveyed to the user. The recognition component 220 can utilize the data store 230 to access for example, the user profile, voice pattern data, language, region, . . . in connection with analyzing the input entry. Based upon user preference, the virtual keys can be provided concurrently as input entry is entered and/or the virtual keys can be provided as a function of recognition threshold. Upon virtual key determination and/or inference, the rendering component 240 provides the user with the virtual keys containing determined and/or inferred input entry.

Figure 3:
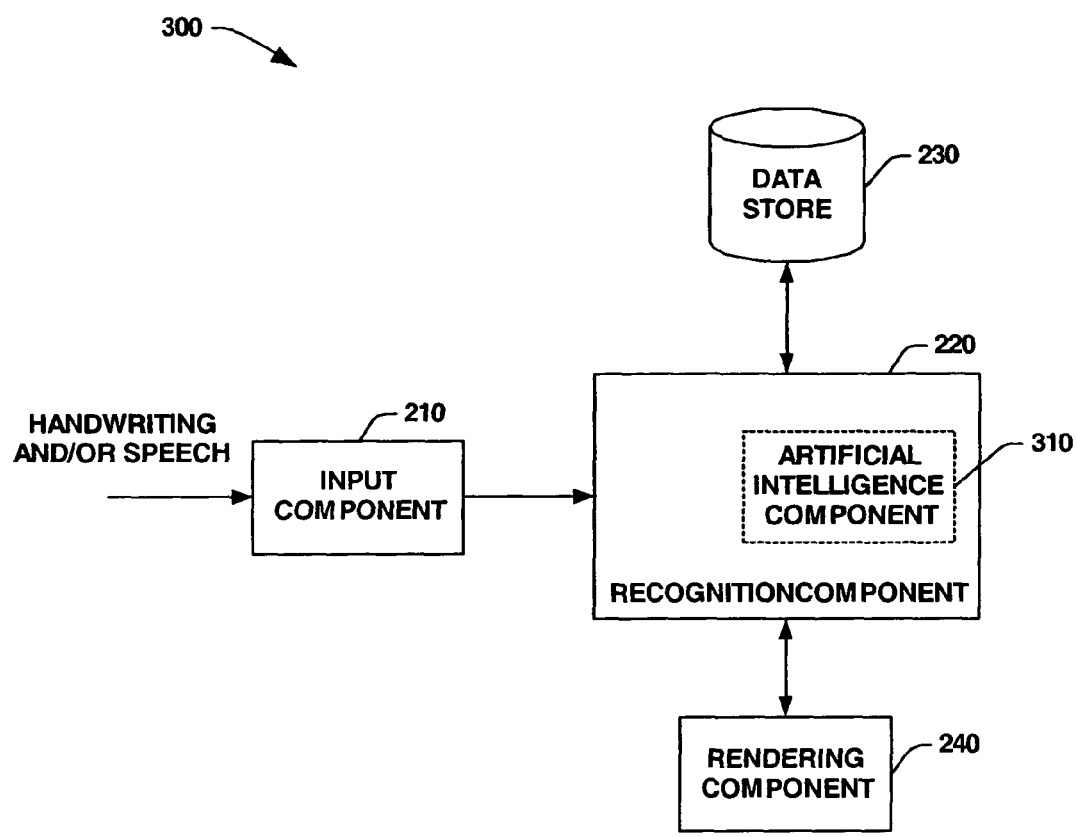
FIG. 3 is a block diagram of handwriting recognition system utilizing artificial intelligence in accordance with an aspect of the present invention. the present invention.

FIG. 3 illustrates a system 300 in which the recognition component 220 comprises an artificial intelligence component 310 to facilitate recognition of input entry received by input component 210. The artificial intelligence component 310 utilizes artificial intelligence techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation) to infer input entry providing the employment of virtual keys within the virtual alpha-numeric keyboard in the portable computing device.

In accordance with one aspect of the present invention, the artificial intelligence component 310 utilizes implicitly and/or explicitly trained classifiers. Explicitly trained classifiers employ classifiers pre-trained by the industry. For example, the portable computing device industry can explicitly train classifiers within recognition systems based upon shipping destination. Thus, the device can contain a classifier explicitly trained for an English speaking user containing an accent (e.g., southern drawl) based upon shipping the devices to Georgia, United States. Additionally, the artificial intelligence component 310 provides implicitly trained classifiers in which specific user historic data is utilized to train the system 300 in the device. For example, the portable computing device can utilize historic information (e.g., font, letter construction, voice patterns, . . . ) regarding the user in order to facilitate the recognition of the input entry.

In accordance with another aspect of the present invention, the artificial intelligence component 310 can contemplate and account for the quality-deterioration of handwriting as a function of time. For example, as the user entered input entry over a period of time, the user can get tired such that input entry quality deteriorates. Artificial intelligence component 310 can provide, for example, implicit classifiers to account for quality deterioration based at least in part upon historic information.

It is to be appreciated that particular embodiments of the invention can employ look-up tables, and/or neural networks, and/or expert systems in connection with providing the various aspects of the invention described herein.

Figure 4:
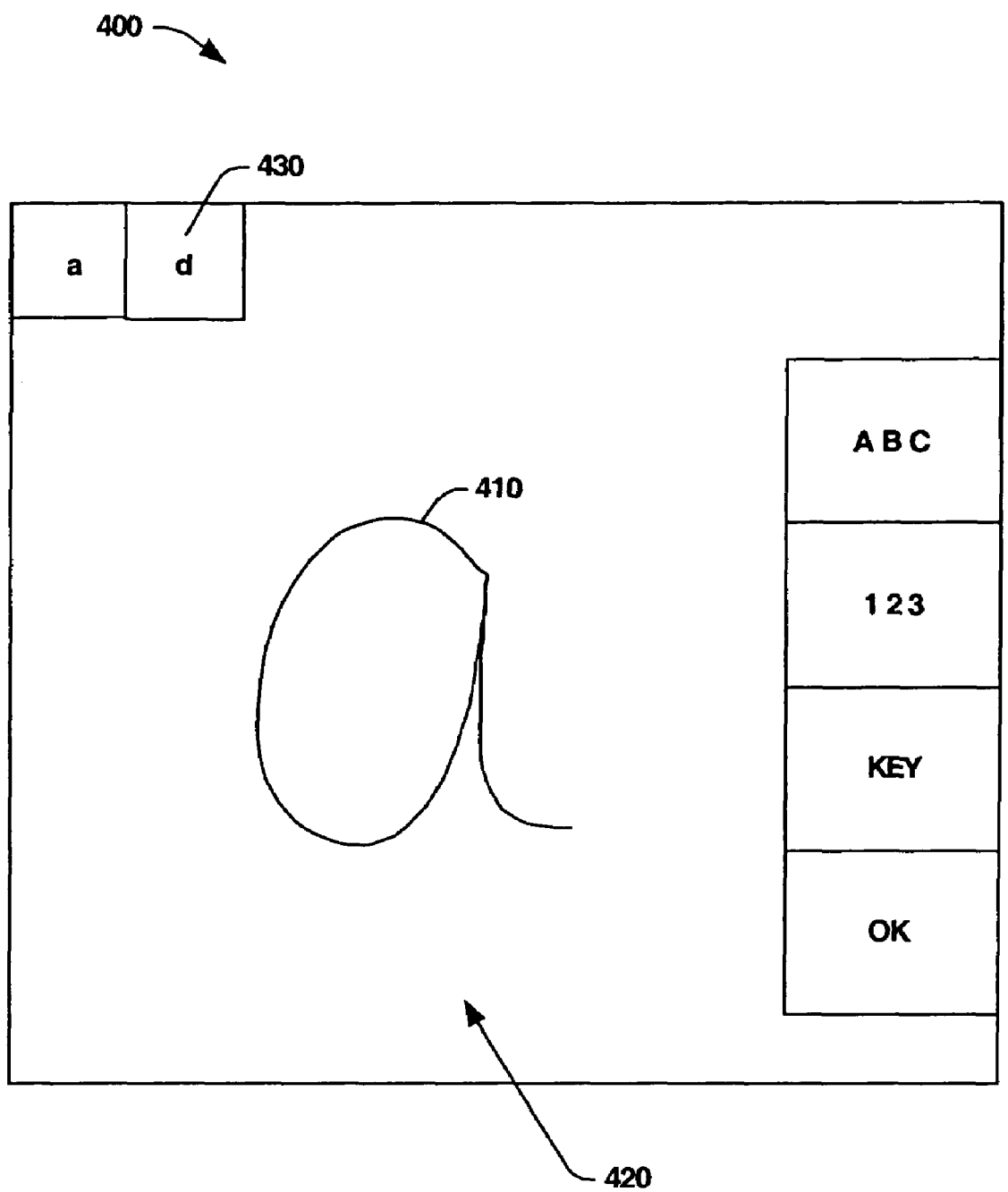
FIG. 4 is a block diagram of an exemplary display in accordance with an aspect of the present invention.
Figure 5:
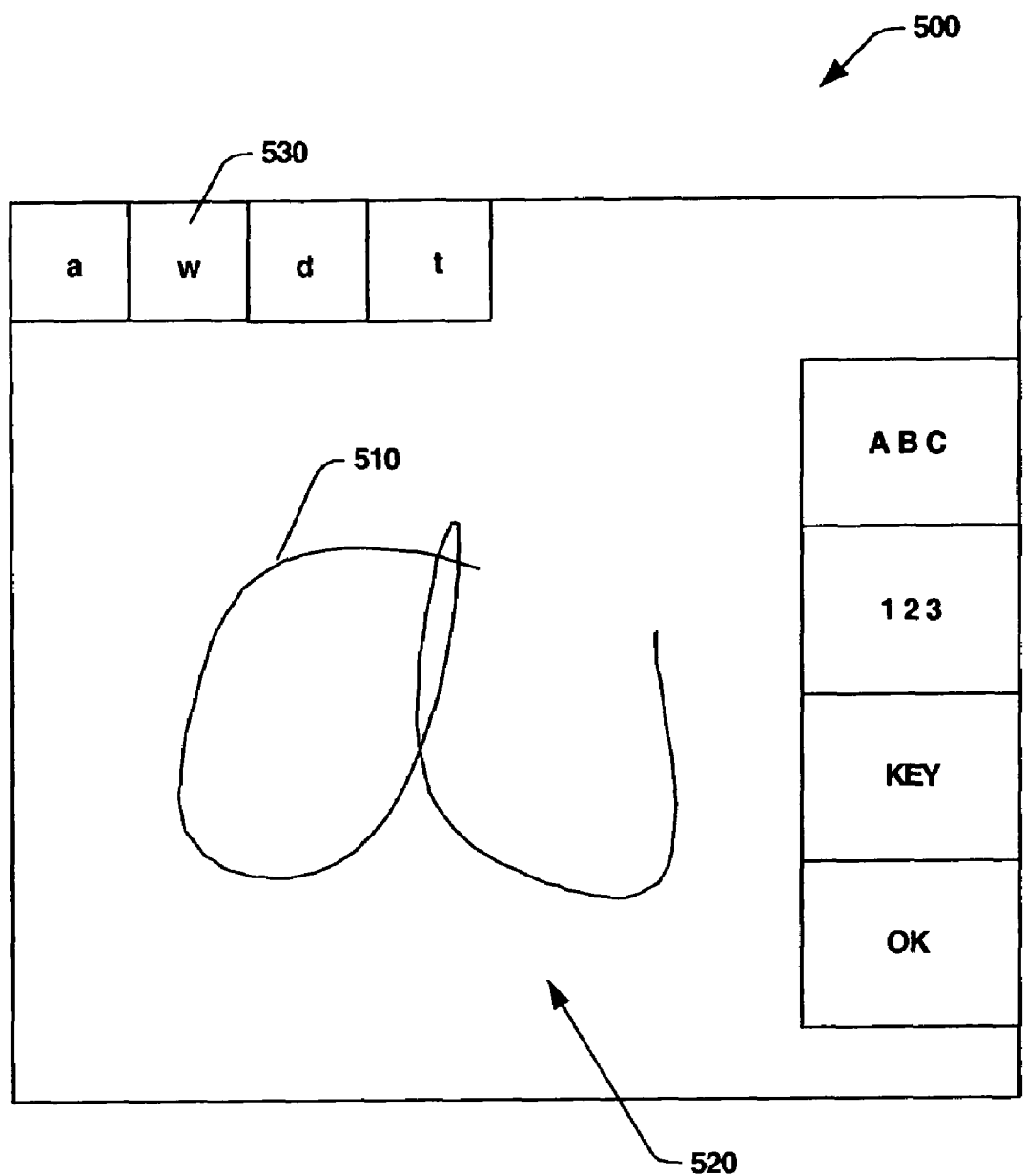
FIG. 5 is a block diagram of an exemplary display in accordance with an aspect of the present invention.
Figure 6:
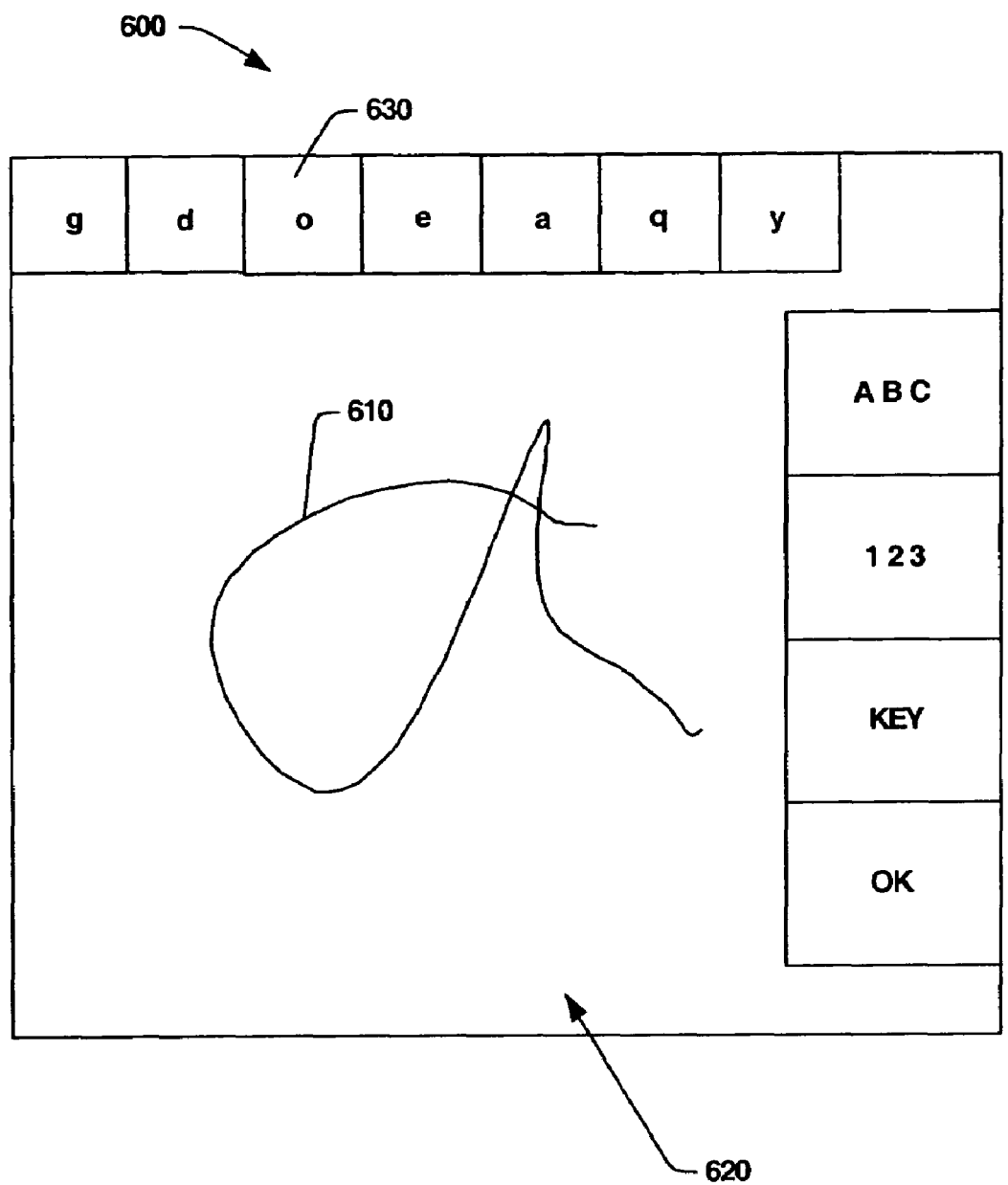
FIG. 6 is a block diagram of an exemplary display in accordance with an aspect of FIG. 7 is a sequence of a handwriting recognition system utilizing starting location in accordance with an aspect of the present invention.

Referring to FIGS. 4-6, exemplary displays 400, 500, and 600 illustrate the facilitation of recognition by employing virtual keys within the virtual alpha-numeric keyboards 430, 530, and 630. The displays 400, 500, and 600 illustrate various input entries 410, 510, and 610 corresponding to a same letter type input by different individuals or by a same individual at different times on respective writing pads 420, 520, and 620 within the portable computing device. For example, the input entry can be an alphabetical letter from the user. It is to be appreciated that the input entry within exemplary displays 400, 500, and 600 are of the same input entry, yet differ in style, size, font, . . . .

FIGS. 4-6 demonstrate the present inventions ability to generate virtual keys based upon the recognition of the user input entry. FIG. 4 contains the input entry 410 where a user one has entered the lower case letter "a." User #1 entered a neat, high-quality letter "a" in which the present invention has generated few virtual keys 430 which the user can select. Turning to FIG. 5, the input entry 510 is a lower case letter "a" entered by a user #2 with less precision than user #1. As precision and quality deteriorate, the invention can provide more virtual keys 530 which the user can select from among for an intended input entry 510. FIG. 6 illustrates a lower case letter "a" with poor quality and precision in comparison to users one and two. Again, as the precision and quality deteriorate, the present invention facilitates the recognition of the input entry 610 with the employment of more virtual keys 630. It is to be appreciated that if the input quality is below a certain threshold, the invention can prompt a user for re-input of information rather than displaying an extraneous number of possible candidates. Accordingly, utility-based analysis is contemplated in accordance with the various aspects of the invention described herein.

In one aspect in accordance to the present invention, the number of virtual keys determined and/or inferred based upon the user input entry can be user selected and/or based upon a recognition threshold. For example, if the user is consistent and precise with input entry, the user can select for a limited number of virtual keys to be displayed and/or select a high value for recognition threshold. In contrary, the sloppy, inconsistent, and non-precise user can elect to have numerous virtual keys displayed and/or a low recognition threshold.

Figure 7:
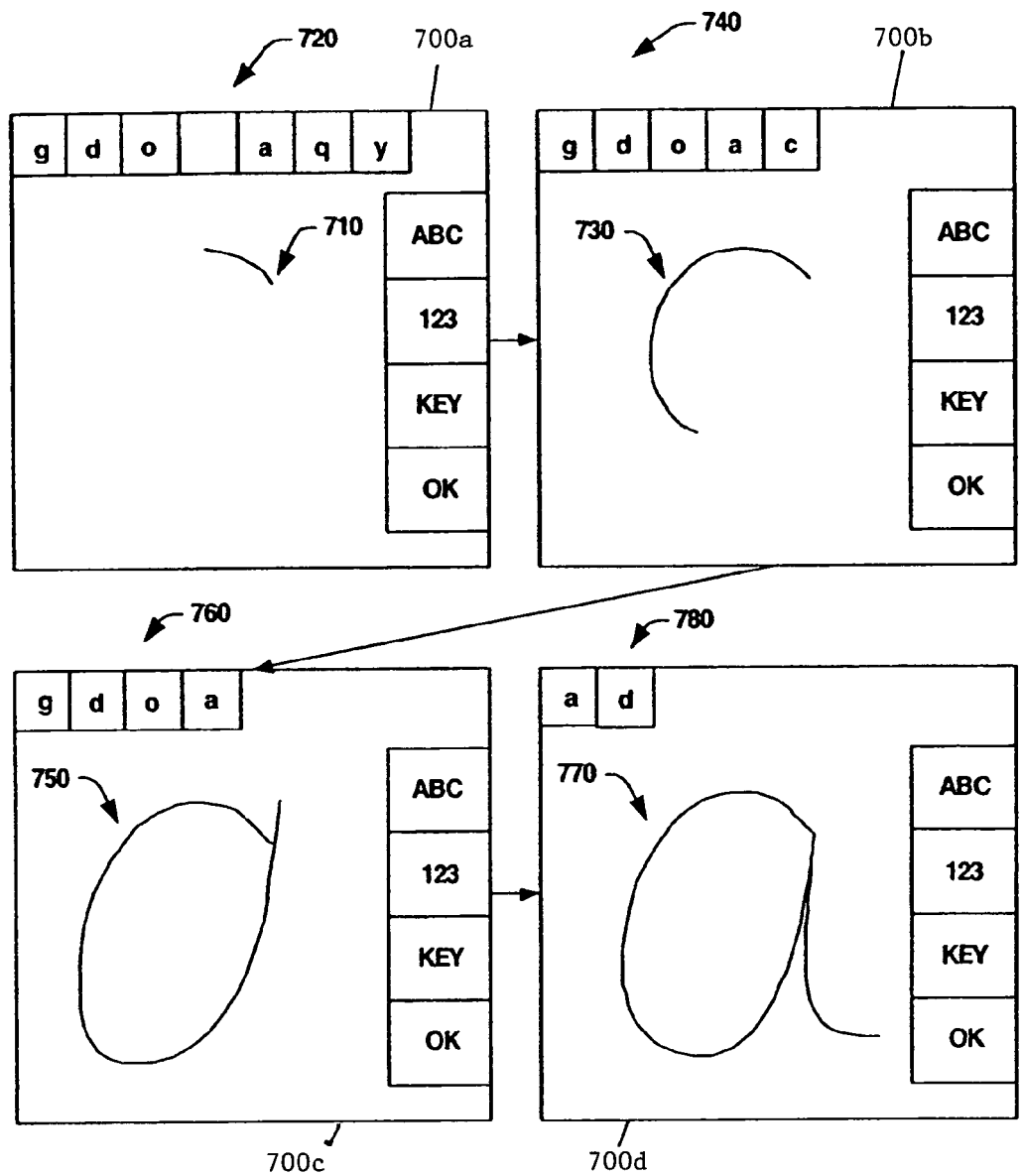

Turning to FIG. 7, a recognition sequence 700a, 700b, 700c, 700d of an exemplary display temporally illustrates determination and/or inference of virtual keys to be displayed as a function of real-time input entry of a character. It is to be appreciated the recognition sequence is in real-time and synchronized upon the user input entry. Once the user input entry has begun, the present invention determines and/or infers possible virtual keys to display to the user in order to facilitate recognition of input entry. Thus, as shown at 700a, the user begins input entry at 710, virtual keys 720 are determined and/or inferred based at least in part upon the incomplete real-time user input entry. As the user continues at 700b entering the input entry 730, the present invention can eliminate virtual keys 740 based at least upon the progress made on the input entry. In progressing in the sequence to 700c, the user has presented enough input entry 750 to determine four virtual keys 760. For example, the virtual keys are "g," "d," "o," and "a." All of the virtual keys presented at 760 are the possible input entry the present invention determines and/or infers. The amount of input entry 750 provides for the writing of the virtual keys 760. In other words, the input entry (e.g., writing strokes) up to 750 are equivalent and/or similar to the input entry (e.g., strokes) necessary to generate the virtual keys 760. At 700d, upon completion of input entry 770, the present invention can display the amount of virtual keys 780 based at least upon the real-time user input entry and/or recognition threshold.

Figure 8:
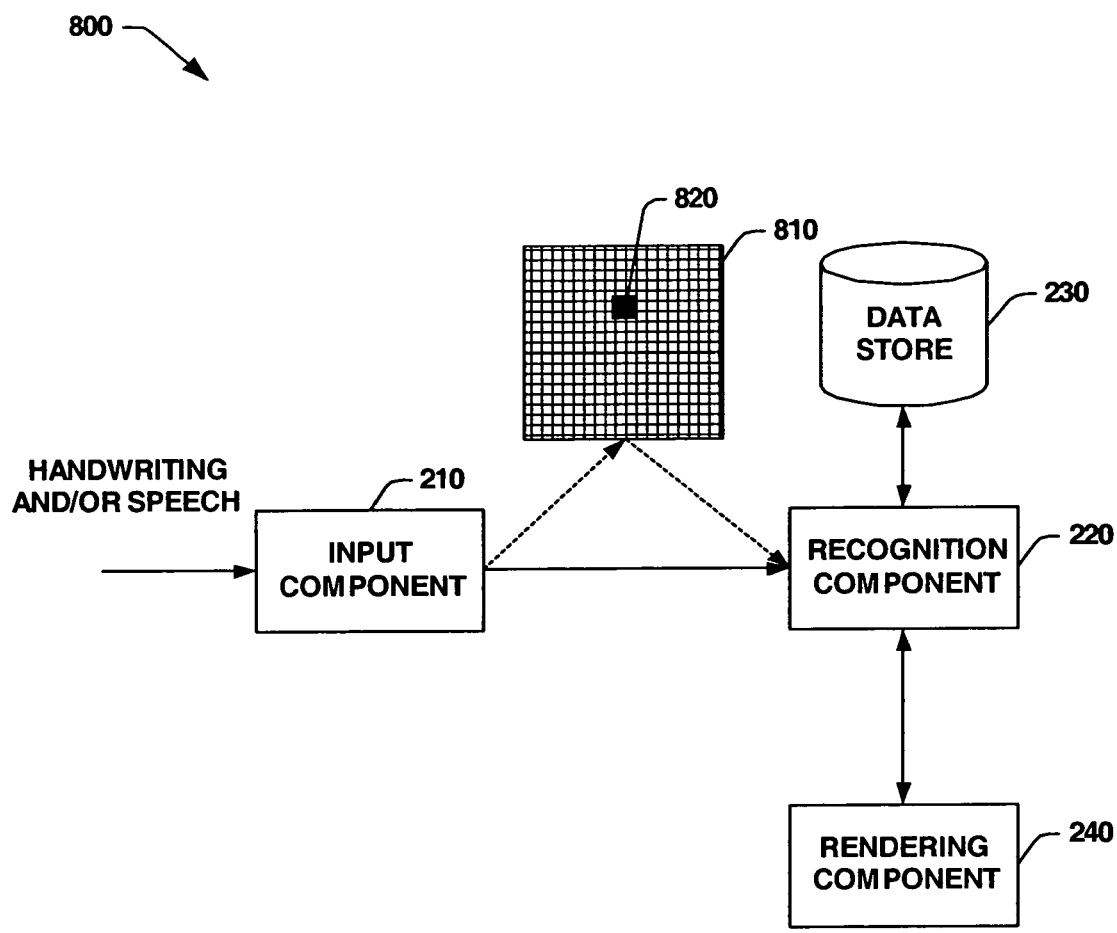
FIG. 8 is a block diagram handwriting recognition system in accordance with an aspect of the present invention.

Referring to FIG. 8, a location-oriented recognition system 800 utilizes a starting and/or ending point of the real-time input entry on the writing pad within the portable computing device. Upon the input component 210 receiving the real-time input entry, the location-oriented recognition system 800 can include the starting and/or ending point of the input entry as an indication factor of possible input entries. The starting and/or ending point provides elimination and/or election of determined and/or inferred input entries. The election and/or elimination of the possible input entries mitigate the recognition component 220 for determining and/or inferring the input entry.

In one aspect in accordance with the present invention, the location-oriented recognition system can include a sectioned and/or grid-pattern on the writing pad such that the writing pad contains zones. Once the real-time input entry is started, the system 800 can eliminate and/or elect the possible input entry based at least in part upon the zone from which the input entry had started. For example, the input entry with the upper-middle starting point 820 provide the system 800 to eliminate and/or elect possible input entries. The system 800 can elect the lower case letters "b," "h," "k," "l," and "t" of which all have a starting point 820 in the upper-middle of the writing pad. In addition to starting point, the system 800 can include the ending point as a factor for determining the possible real-time input entry.

Furthermore, the system 800 can utilize artificial intelligence techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation) to infer the possible input entry. Trained implicit and explicit classifiers can infer the user typical starting and/or ending point for the real-time input entry. For example, the user providing handwriting input entry can be consistent with the starting and/or ending point entering letters and/or symbols. Such a consistent input entry can employ implicit and explicit classifiers to eliminate and/or elect possible input entries.

Figure 9:
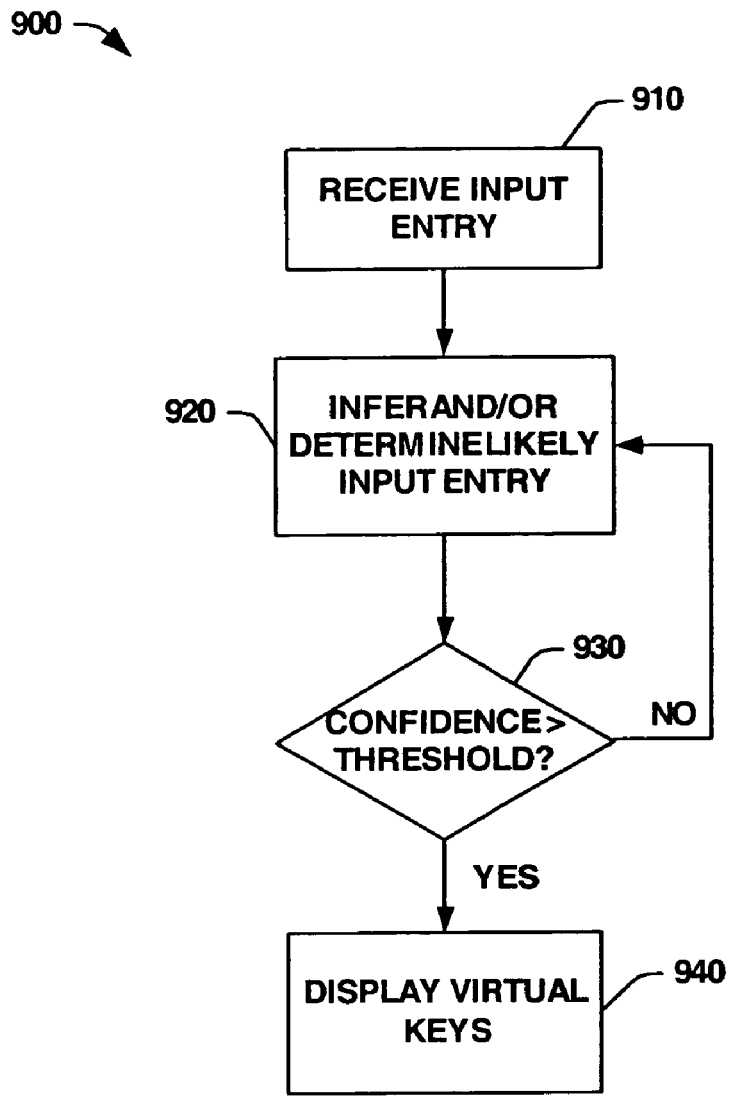
FIG. 9 is a flow chart illustrating a methodology for a handwriting recognition system in accordance with an aspect of the present invention.
Figure 10:
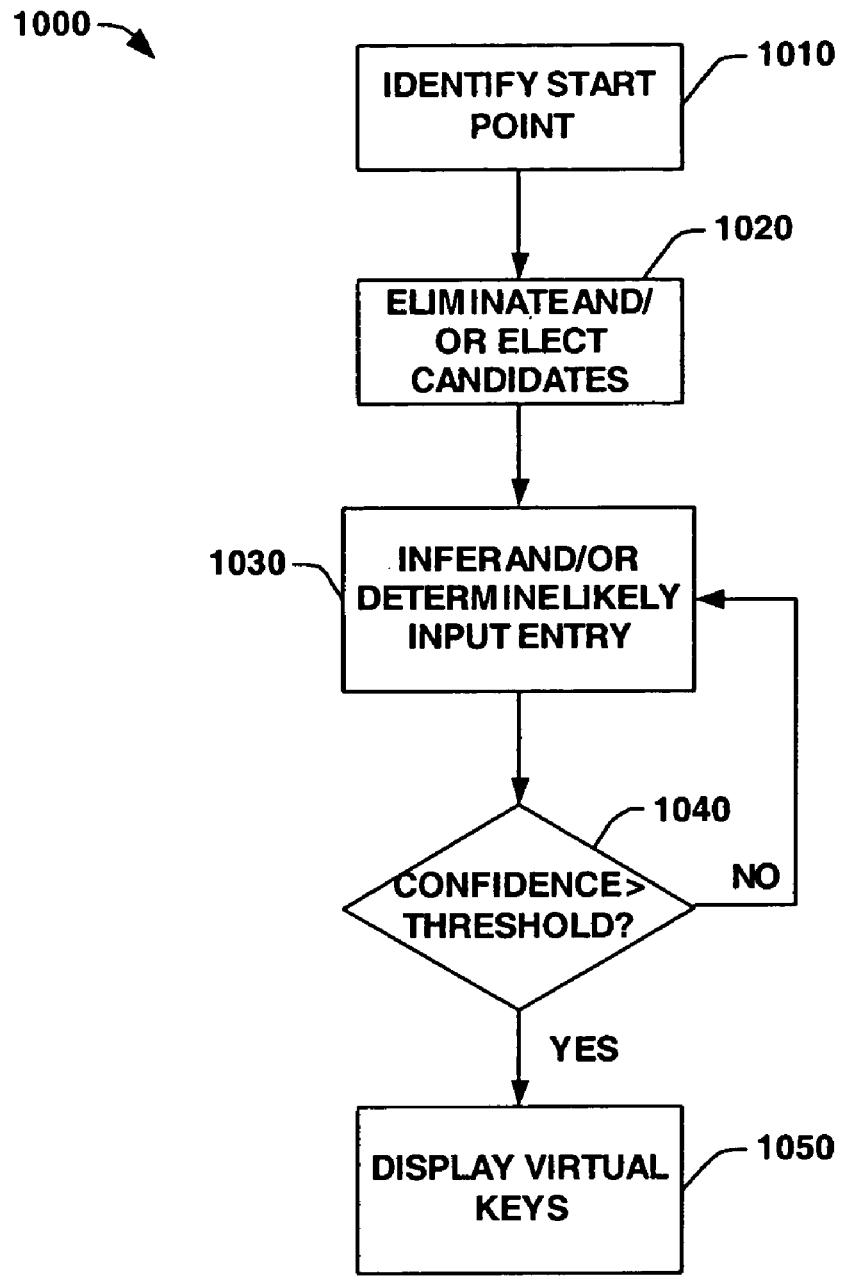
FIG. 10 is a flow chart illustrating a methodology for handwriting recognition system in accordance with an aspect of the present invention.

FIGS. 9 and 10 illustrate various methodologies in accordance with the subject invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 9 illustrates a methodology 900 for providing virtual keys for the portable computing device. At 910, the input is received and can be, for example, voice and/or handwriting. Synchronized with the real-time input entry, the present invention infers and/or determines the likely input entry at 920. At 930, the inference and determination of the real-time input entry can satisfy the recognition threshold. If the confidence of the inferred and/or determined input entry is not greater than the recognition threshold, the present invention can continue recognition analysis until a likely input entry is above the threshold. Once the recognition threshold is surpassed, the virtual keys containing the inferred and/or determined input entry are displayed within the virtual alphanumeric keyboard at 940. In one aspect in accordance with the present invention, displaying the virtual keys can be synchronized with the real-time input entry.

FIG. 10 illustrates a methodology 1000 for providing virtual keys based at least upon starting and/or ending point of the input entry for a portable computing device. At 1010, the starting point of the real-time input entry is identified. For example, the writing pad within the portable computing device can be divided into grids and/or zones. Based at least in part upon the starting point of the input entry (e.g., the grid and/or zone location of input entry), the present invention can eliminate and or elect candidates as possible input entry at 1020. In one aspect in accordance with the present invention, artificial intelligence techniques (e.g., implicit and/or explicit classifiers) can be used to facilitate the election and/or elimination of possible input entries. At 1030, the input entry is inferred and/or determined within real-time. The present invention can utilize a data store containing zone and input entry correlation information such as input entry linked with zone location and the likelihood of correlation percentage. At 1040, the inferred and/or determined input entry can satisfy the recognition threshold. If the recognition threshold is satisfied, the virtual keys containing the inferred input entry is presented to the user at 1050. In another aspect in accordance with the present invention, the ending point of the real-time input entry can be another factor to determine and/or infer the possible input entry.

Figure 11:
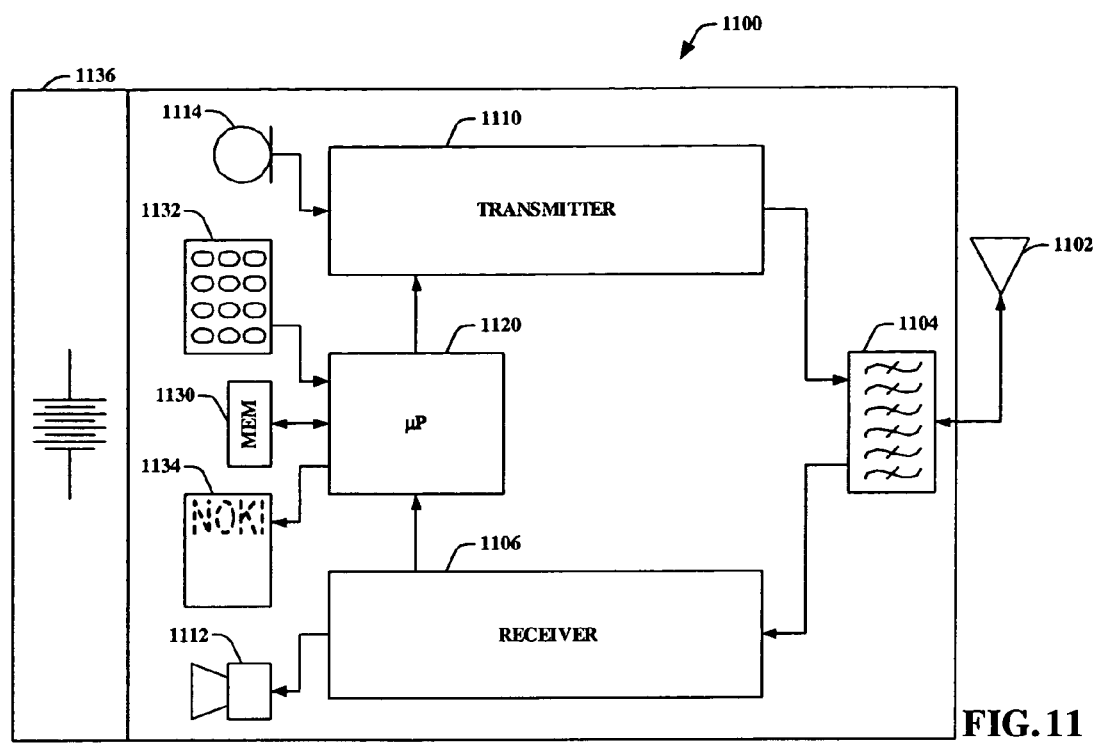
FIG. 11 is a schematic illustration of an exemplary communication device in accordance with the present invention.

FIG. 11 illustrates an exemplary communications device 1100 (e.g., mobile station, base station) which can be employed as a cellular communications system in accordance with the subject invention. The illustrated communications device 1100 comprises an antenna 1102 and a connected duplex filter 1104, where a reception-frequency signal received by the antenna 1102 is directed to a receiver 1106, and the signal from a transmitter 1110 is directed to the antenna 1102. The receiver 1106 provides reception, downmixing, demodulation and decoding functions by which a received radio-frequency signal is converted to an analog audio signal, which is then directed to a speaker 1112, and to data signals which are directed to a processor 1120. The transmitter 1110 comprises usual coding, interleaving, modulation and upmixing functions whereby the analog audio signal produced by the microphone 1114 and the data signals received by the processor 1120 are converted to a transmittable radio-frequency signal. In addition, the communication device 1100 comprises a memory 1130, a keyboard 1132, a display 1134 and a power source 1136. The receiver as described herein provides for mitigating of ICI especially with respect to high-order modulation application. The processor 1120 executes necessary algorithms and also in other ways controls operation of the communications device 1100, at least in part under directions of program(s) recorded in the memory 1130, and commands input via a user and system commands (e.g., transmitted via a base station).

Figure 12:
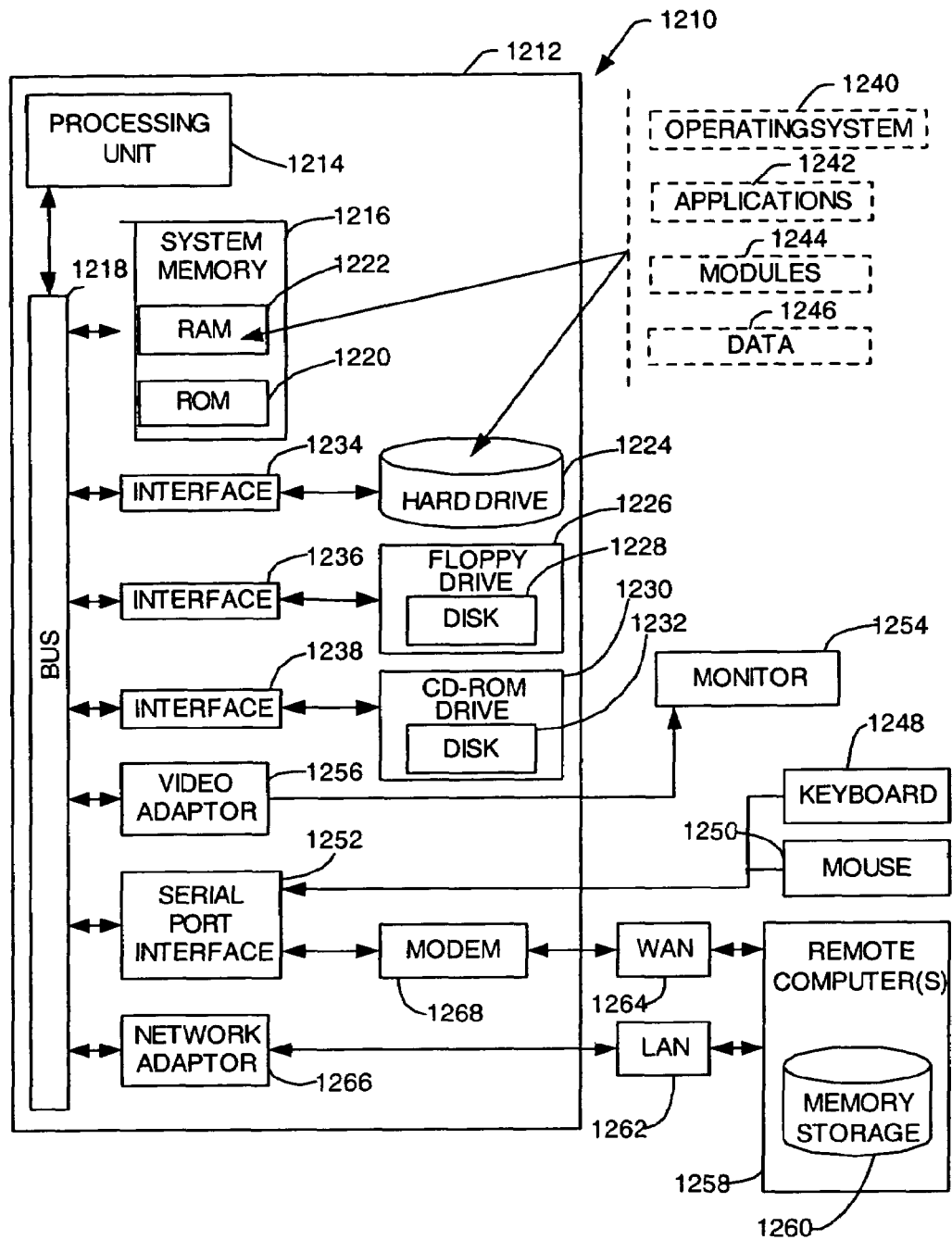
FIG. 12 is a schematic block diagram of an exemplary operating environment for a system configured in accordance with the present invention.

In order to provide additional context for various aspects of the present invention, FIG. 12 and the following discussion are intended to provide a brief, general description of one possible suitable computing environment 1210 in which the various aspects of the present invention may be implemented. It is to be appreciated that the computing environment 1210 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 12 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 12, an exemplary environment 1210 for implementing various aspects of the invention includes a computer 1212, including a processing unit 1214, a system memory 1216, and a system bus 1218 that couples various system components including the system memory to the processing unit 1214. The processing unit 1214 may be any of various commercially available processors. Dual microprocessors and other multi-processor architectures also can be used as the processing unit 1214.

The system bus 1218 may be any of several types of bus structure including a memory bus or memory controller, a peripheral bus, and a local bus using any of a variety of commercially available bus architectures. The computer memory 1216 includes read only memory (ROM) 1220 and random access memory (RAM) 1222. A basic input/output system (BIOS), containing the basic routines that help to transfer information between elements within the computer 1212, such as during start-up, is stored in ROM 1220.

The computer 1212 may further include a hard disk drive 1224, a magnetic disk drive 1226, e.g., to read from or write to a removable disk 1228, and an optical disk drive 1230, e.g., for reading a CD-ROM disk 1232 or to read from or write to other optical media. The hard disk drive 1224, magnetic disk drive 1226, and optical disk drive 1230 are connected to the system bus 1218 by a hard disk drive interface 1234, a magnetic disk drive interface 1236, and an optical drive interface 1238, respectively. The computer 1212 typically includes at least some form of computer readable media. Computer readable media can be any available media that can be accessed by the computer 1212. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1212. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1222, including an operating system 1240, one or more application programs 1242, other program modules 1244, and program non-interrupt data 1246. The operating system 1240 in the computer 1212 can be any of a number of commercially available operating systems.

A user may enter commands and information into the computer 1212 through a keyboard 1248 and a pointing device, such as a mouse 1250. Other input devices (not shown) may include a microphone, an IR remote control, a joystick, a game pad, a satellite dish, a scanner, or the like. These and other input devices are often connected to the processing unit 1214 through a serial port interface 1252 that is coupled to the system bus 1218, but may be connected by other interfaces, such as a parallel port, a game port, a universal serial bus ("USB"), an IR interface, etc. A monitor 1254, or other type of display device, is also connected to the system bus 1218 via an interface, such as a video adapter 1256. In addition to the monitor, a computer typically includes other peripheral output devices (not shown), such as speakers, printers etc.

The computer 1212 may operate in a networked environment using logical and/or physical connections to one or more remote computers, such as a remote computer(s) 1258. The remote computer(s) 1258 may be a workstation, a server computer, a router, a personal computer, microprocessor based entertainment appliance, a peer device or other common network node, and typically includes many or all of the elements described relative to the computer 1212, although, for purposes of brevity, only a memory storage device 1260 is illustrated. The logical connections depicted include a local area network (LAN) 1262 and a wide area network (WAN) 1264. Such networking environments are commonplace in offices, enterprise-wide computer networks, intranets and the Internet.

When used in a LAN networking environment, the computer 1212 is connected to the local network 1262 through a network interface or adapter 1266. When used in a WAN networking environment, the computer 1212 typically includes a modem 1268, or is connected to a communications server on the LAN, or has other means for establishing communications over the WAN 1264, such as the Internet. The modem 1268, which may be internal or external, is connected to the system bus 1218 via the serial port interface 1252. In a networked environment, program modules depicted relative to the computer 1212, or portions thereof, may be stored in the remote memory storage device 1260. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A recognition system comprising:
   an input component configured to receive a first portion of an analog user input to be recognized;
   a recognition component configured to analyze the first portion of the analog user input and identify a first subset of virtual keys of a plurality of available virtual keys to concurrently convey to a user during the analog user input; and
   a rendering component configured to display the first subset of virtual keys to the user concurrently with receiving the first portion of the analog user input,
   wherein the input component is configured to receive a second portion of the analog user input,
   wherein the recognition component is configured to analyze the second portion of the analog user input and eliminate at least one virtual key from the first subset of virtual keys to produce a second subset of virtual keys to concurrently convey to the user during the analog user input, and
   wherein the rendering component is configured to display the second subset of virtual keys to the user concurrently with receiving the second portion of the analog user input.

2. The recognition system of claim 1, wherein the analog user input being handwriting.

3. The recognition system of claim 1, further comprising a data store having stored thereon a plurality of user profiles that the recognition component employs in connection with the analysis.

4. The system of claim 1, the recognition component utilizing an artificial intelligence component providing inference of possible real-time input entry.

5. The system of claim 4, further comprising a trained classifier.

6. The system of claim 4, the artificial intelligence component contemplating and/or accounting for quality-deterioration of the real-time input.

7. The system. of claim 4, the recognition component utilizing a starting point of the real-time input entry for determination and/or inference.

8. The system of claim 4, the recognition component utilizing an ending point of the real-time input entry for determination and/or inference.

9. The system of claim 1, displaying N virtual keys, N being an integer, and N being a function of confidence associated with the analysis.

10. The system of claim 9, the virtual keys being dynamically determined and/or inferred.

11. A portable communications device comprising the system of claim 1.

12. A portable computing device comprising the system of claim 1.

13. The system of claim 1, the recognition component concurrently analyzing handwriting and voice input.

14. The system of claim 13, the hand-writing and voice input are part of a single user input.

15. A method, comprising:
   receiving a first portion of an analog user input;
   analyzing the first portion of the analog user input,
   determining a first subset of virtual keys to display to a user;
   displaying the first subset of virtual keys concurrently with receiving the first portion of the analog user input,
   receiving a second portion of the analog user input,
   analyzing the second portion of the analog user input,
   determining a second subset of virtual keys by eliminating at least one virtual key from the first subset of virtual keys to produce a second subset of virtual keys, and
   displaying the second subset of virtual keys concurrently with receiving the second portion of the analog user input.

16. The method of claim 15, the user input being handwriting.

17. A method of claim 15, the determination being dynamic, and the first subset being modified as a function of temporally receiving the user input.

18. A computer readable medium having stored thereon computer executable instructions for carrying out the method of claim 15.

19. A recognition system, comprising:
   means for receiving a first portion of an analog user input;
   means for analyzing the first portion of the analog user input, and determining a first subset of virtual keys to display to a user;
   means for displaying the first subset of virtual keys concurrently with receiving the first portion of the analog user input;
   means for receiving a second portion of the analog user input,
   means for analyzing the second portion of the analog user input,
   means for determining a second subset of virtual keys by eliminating at least one virtual key from the first subset of virtual keys to produce a second subset of virtual keys, and
   means for displaying the second subset of virtual keys concurrently with receiving the second portion of the analog user input.

* * * * *

UNITED STATES PATENT AND TRADEMARK OFFICE
CERTIFICATE OF CORRECTION

| | | |
|---|---|---|
| PATENT NO. | : 7,490,041 B2 | Page 1 of 1 |
| APPLICATION NO. | : 10/621007 | |
| DATED | : February 10, 2009 | |
| INVENTOR(S) | : Scott Davis | |

It is certified that error appears in the above-identified patent and that said Letters Patent is hereby corrected as shown below:

In column 15 at line 1 (claim 17, line 1), please delete "A" and insert --The-- therefor.

Signed and Sealed this

Twenty-first Day of April, 2009

JOHN DOLL
*Acting Director of the United States Patent and Trademark Office*